United States Patent [19]
Broghammer et al.

[11] 4,058,687
[45] Nov. 15, 1977

[54] CASSETTE RECORDER WITH SWITCHING FOR A DEVICE FOR NOISE SUPPRESSION

[75] Inventors: Werner Broghammer, Tennenbronn; Jürgen Krämer, Peterzell; Helmut Laufer, St. Georgen, all of Germany

[73] Assignee: Dual Gebruder Steidinger, St. Georgen, Black Forest, Germany

[21] Appl. No.: 712,945

[22] Filed: Aug. 9, 1976

[30] Foreign Application Priority Data

Aug. 29, 1975 Germany .............................. 2538479

[51] Int. Cl.² ............................................. G11B 31/00
[52] U.S. Cl. ................................. 179/100.11; 360/137
[58] Field of Search ................... 179/100.11; 325/311; 360/60, 132, 137

[56] References Cited

U.S. PATENT DOCUMENTS 3,294,917  12/1966  Lempert ........................ 179/100.11
3,507,501  4/1970   Lear ............................... 179/100.11
3,899,795  8/1975   Watanabe ............................. 360/60

Primary Examiner—Raymond F. Cardillo, Jr.
Attorney, Agent, or Firm—Martin A. Farber

[57] ABSTRACT

A magnetic tape recorder for recording as well as for playback of sound, having a noise suppression device, and sensor member with an abutment surface for engaging against an unopened break through tab of a tape cassette for causing a locking mode for the recording device to be inoperative. The sensor member has an additional abutment surface arranged such that the latter abutment surface senses the wall of the cassette outside of the broken-through penetration opening of the cassette and the insert movement of the sensor member is limited in the opened penetration opening. The sensor member is connected with the locking device; such that in the absence of the limitation due to the absence of a cassette, the locking device, is also inoperative.

6 Claims, 5 Drawing Figures

CASSETTE RECORDER WITH SWITCHING FOR A DEVICE FOR NOISE SUPPRESSION

The present invention relates to a cassette - magnetic tape recorder with a device for noise suppression.

It is known in magnetic sound recording, in order to increase the ratio of the useful voltage to noise voltage, particularly to improve the signal-to-noise ratio, to provide electric circuits which act by exerting a certain influence on the playback circuit. One of these circuits has become particularly well known under the name "Dolby". For the sake of simplicity, in the following the Dolby circuit will be taken as representative of all of these circuits. As known, the principle of the Dolby circuit can also be applied to improve the signal-to-noise ratio in frequency-modulated radio transmission.

In order that such a circuit need not be provided as one integral part or component of the radio receiver and in addition a second one as an integral part or component of a tape recorder, it is known to provide the tape recorder with a switch means which makes it possible to use the built-in circuits also for radio reproduction.

The present invention as one object thereof sets out to improve the state of the art of a tape recorder for recording and playback, respectively, of magnetic tapes which are provided in cassettes; the rear wall of the latter contains a perforation tab which has been previously prepared to be broken open. After the recording has been made, the perforation tab can be opened by hand. The perforation tab is disposed in the range of operation of a sensing member having an abutment surface, which sensing member is provided in the tape recorder. The sensing member actuates a lock member for switching on the recording mode, such that the lock member is operative when the sensing member steps into the opened perforation; and the lock member is inoperative when the sensing member is hindered or blocked by engagement with its abutment surface on the unbroken cassette wall. This tape recorder further has a device for noise suppression which is operative during recording, and a switching or automatic transfer device for use of this device for the direct reproduction of a radio broadcast which is prepared according to the same principle.

Such an apparatus is operated in the following manner in order to directly reproduce a radio broadcast which has been prepared for a noise suppression operation. A special button is actuated for the direct reproduction of a broadcast, for instance in accordance with the Dolby process, and one inserts a magnetic tape cassette which permits recording (i.e., a cassette having an unopened perforation tab) so that the sensor member which is connected with the recording interlock cannot enter the perforation opening and block the record button, which subsequently is to be depressed. Thereafter a so-called pause button is actuated. The pause button (by means of lifting the capstan roller away from the capstan) prevents the transport movement of the tape. Such transport movement otherwise would occur since the start button still must be depressed, which start button in addition to effecting the necessary elimination of the short circuit in the output of the apparatus (which short circuit is customary in order to prevent noise), also activates the mechanical drive devices for the running of the tape during the recording or playback. Furthermore, the record button must also be actuated so that the input of the apparatus (and not the playback head) is connected to the input of the equalizer (correcting)-amplifier of the apparatus.

It is another object of the present invention to simplify the handling and manipulation for using the Dolby circuit of a magnetic tape recorder for reproduction of a radio broadcast by doing away with the introduction of the cassette for this purpose.

According to the invention the sensing member 8 is provided with an additional abutment (stop) surface 15, which surface is arranged such that the abutment surface 15 senses the wall 22 of the cassette 4 outside of the break-through penetration opening 10 and the insert movement of the sensing member 8 is limited in the opened penetration opening (10); and the sensing member is connected with the locking device 16, 17 such that in the absence of the limitation due to the absence of a cassette, the locking device 16, 17 is also inoperative.

By using another abutment stop surface, in the manner that the sensor member is provided with two positions by which the record interlock is eliminated, not only is a simpler handling of the apparatus achieved, but in this way also an illogical operating action is eliminated.

Another embodiment of the present invention further is based on an object to simplify the procedure for using the Dolby circuit, by eliminating the actuation of the start button and the pause button.

According to the present invention the recorder is provided with a switching device for short-circuiting of the output of the switching device, which device is actuated in dependency on operating or actuating members which are provided in any case, such that its effectiveness or operability is eliminated at least during normal running speed of the magnetic tape, that is, during recording or playback, characterized in that the short-circuit switching device comprising the contact pair 32, 33 is operatively connected with the operating element for the fast forward movement 20 and with that for the fast reverse movement 21 and becomes effective or operative by actuation of one of these operating elements 20 or 21.

This further development of the invention is based on the realization that the elimination of the short circuit in the output of the apparatus need not require actuation of the start button.

With the above and other objects and advantages in view, the present invention will become more clearly understood from the following detailed description of the preferred embodiments considered in connection with the accompanying drawings, of which FIG. 1 is a front view of a tape recorder with a connected radio reception part;

Figure 1:
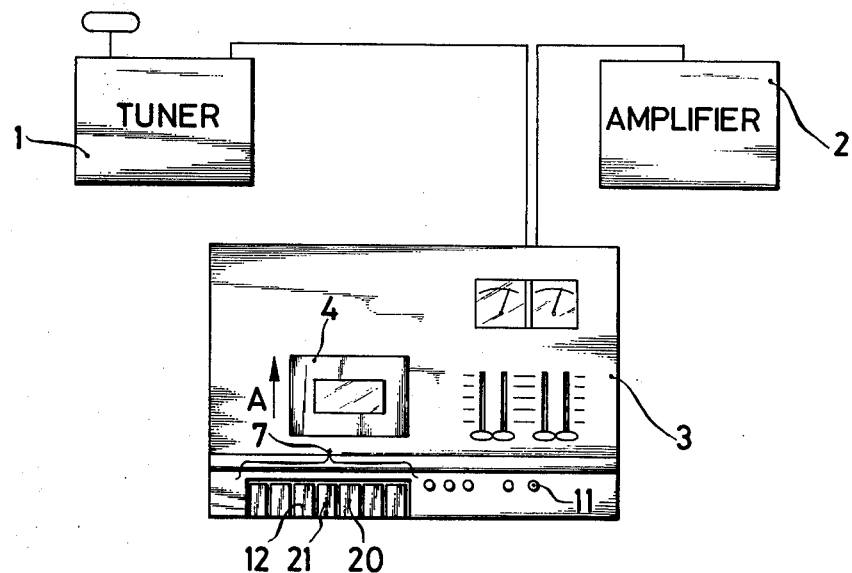

Referring now to the drawings, and more particularly to FIGS. 1 and 2–4, the radio reproduction arrangement comprises the interconnected components comprising a tuner 1, a low-frequency amplifier 2, and a magnetic tape cassette recorder 3. The tape cassette 4 can be brought into operating position by pushing it in the direction A, into a hinged channel receptor 6 for the tape recorder 3. A group of buttons 7 serves to produce the different operating conditions.

A sensor member 8 is displaceably mounted for displacement in the direction of insertion A of the cassette 4 or 5 against the action of a spring 9, the latter being operatively connected thereto and to an adjacent projection 19a of the housing 19b. The sensor member 8 is integrally connected with a lock member 16, the latter lying in its unactuated position against an abutment or stop 19 (FIG. 2), which stop 19 is secured to the housing 19b. Only when the sensor member 8 is in a specific position (FIG. 3), is the lock member 16 within the range of action of a nose or projection 17 of the record key or button 12 so as to prevent the record key or button 12 from being depressed. Herein member 16 and projection nose 17 constitute a locking means for blocking the placement of the recording mode in operating condition.

Figure 3:
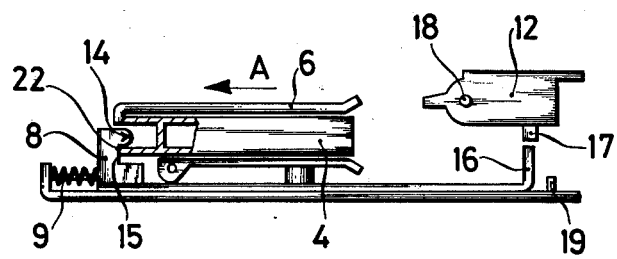
FIG. 3 is a view similar to FIG. 2 but with a recorded cassette inserted therein.
Figure 4:
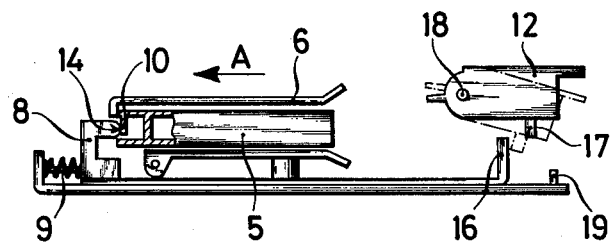
FIG. 4 is a view similar to FIG. 2 but with an unrecorded cassette inserted therein.

To assure a better understanding, the known steps which are normally necessary for the recording of or playback from a magnetic tape will be described, first of all with respect to the action of the sensor member 8 (FIGS. 3 and 4).

If an unrecorded cassette 5 (FIG. 4) is inserted in the direction of sensing movement A into the channel receptor 6, the sensor member 8 is displaced against the biasing action of the compression spring 9, the abutment surface 14 of the sensor 8 being pushed by the rear wall 10 (constituting in part thereat a selectively breakable break-through tab) of the cassette 5 in the insertion direction A. The cassette 5 is held in known manner (not shown in detail) in the cassette receptor 6 in the inserted position (FIG. 4). In this position or maximum displacement the lock member 16, which is integrally connected with the sensor member 8, and thus displaceable therewith, is moved into an inactive or inoperative position, so that the record button 12 can be depressed as indicated in dot-dashed lines in order to actuate the recording device. (For the recording operation, the start button must also then be depressed).

Referring now to FIG. 3, if a recorded cassette 4 (i.e., a cassette whose rear wall 10 or removeable break-through tab portion 10 has been broken-off in the region corresponding to the sensor member 8) is inserted into the channel receptor 6, the sensor member 8 can penetrate into the break-through opening (formed by breaking off the tab 10) in the cassette 4 until an additional abutment stop surface 15 of the member 8 abuts against an unbroken-off part 22 of the rear wall 10 of the cassette (FIG. 3). In this position of the sensor member 8, the lock member 16 is only slightly displaced and lies within the range of operation of the nose 17 of the record button 12, so that the latter is blocked against being depressed. (For playback, the start button must be depressed). The new feature with respect to this blocked position of the sensor member 8, in accordance with the invention, is that it is obtained by the arrangement of, and by the engagement of the special abutment surface 15 against the housing wall 10 (namely the part 22) of the cassette 4. The abutment surface 15 is formed by the rear wall 15 of a recess formed in the abutment surface 14 and thus in the sensor member 8, which abutment surface 15 is rearwardly disposed relative to the abutment surface 14 and therebelow.

If no cassette is in channel receptor 6, then the lock member 16 remains, by the biasing action of the spring 9, in its initial position (FIG. 2) which is so selected such that the lock member does not lie within the range of action of the nose 17 of the record button 12, and so that in this position of the sensor member 8, the record button 12 also can be depressed.

If the tape recorder is to be used for the direct reproduction of a radio broadcast in accordance with the Dolby process, the button 11 (FIG. 1), which is provided especially for this purpose, is first of all depressed, whereby in known manner, the Dolby circuit is brought into the reproduction position. Furthermore the record button 12 must be depressed in customary fashion, which in accordance with the preceding description, is possible without the prior insertion of an unrecorded cassette 5. The start button 12 can now be depressed in order to eliminate or terminate the short circuit in the output of the device. Actuation of the pause or stop button is not required, at least not in order to avoid transport movement of the tape, since no tape is present.

Figure 5:
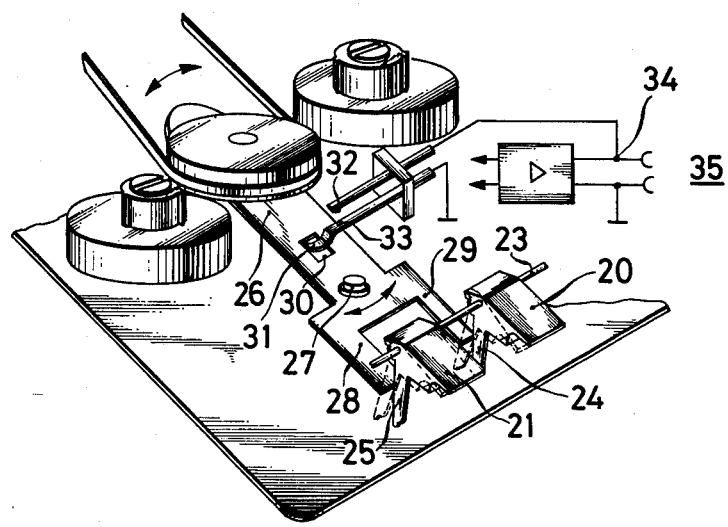
FIG. 5 is a perspective view of a further development of the invention showing details of the function of the actuation members.
Figure 2:
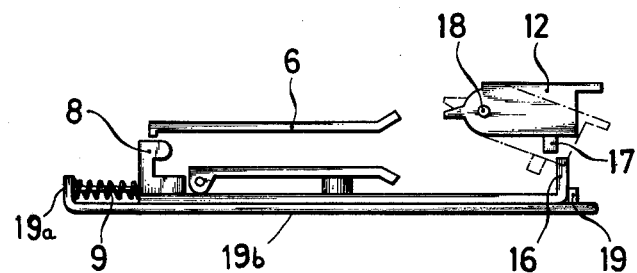
FIG. 2 is a detail side elevational view of the tape recorder with respect to the dependency of the record interlock on the tape cassette.

Referring now again to the drawings, and more particularly to FIG. 5, as a further development of the invention, the control of the short circuit in the output of the apparatus is changed. (The short circuit was heretofore eliminated by the depression of the start button). The actuating means or buttons 20 and 21 for control of the fast forward and reverse running, respectively, are pivotally supported about an axle 23 and are formed as angle levers by arms 24 and 25, respectively, which extend downwardly. A three-armed fork-shaped control lever 26, 28, 29, one arm 26 of which controls the respective drive devices for the fast forward and reverse, is pivotable about an axle 27 as indicated by the curved double ended arrow. The other two arms 29 and 28 lie within the operative range of action of the arms 24 and 25, respectively, the latter being connected with the respective buttons 20 and 21. The arms 24 and 25 and the respective arms 29 and 28 are formed and arranged relative to each other such that by pressing the buttons 20 and 21, the lever 26–28 is rotated counter-clockwise or clockwise, respectively, about the axle 27.

An actuating projection or cam 31 of a pair of short circuiting contacts 32 and 33 rests in a recess 30 of the control arm 26. The contact pair 32, 33 is operatively connected on the one hand, with the ungrounded line 34 of the output 35 of the device and on the other hand, to ground, respectively. The pair of contacts 32, 33 is open in the position shown in the drawing.

If the fast-forward button 20 is actuated as indicated in dashed lines, then by means of its arm 24, the control lever 29, 26 with its arm 26 is swung in the counter-clockwise direction about the axle 27, whereby the actuating cam projection 31 is lifted out of the recess 30 in the control arm 26 and by abutment on the lever arm 26 is pressed upwardly and closes the contact pair 32, 33, so that the output 35 of the apparatus is short circuited. The control lever 26–29 constitutes a connecting means operatively disposed between the actuating buttons 20 and 21, respectively, and the short circuiting contacts 32, 33. A short circuit also is produced when the button 21 for fast reverse is actuated since then the actuating projection 31 is also lifted out of the recess 30 by rotation of the contact lever 28, 26. Since, in accordance with this arrangement, the short circuiting of the output 35 is not present in principle as in the case of the previously known devices, and need not be eliminated upon the establishing of an operating function (start), but is established only for one given operating function (fast forward or reverse), and consequently is automatically eliminated upon the termination of this function, an actuation of the start button is not necessary for this purpose (and there is no other purpose in the case of radio reproduction). If the start button is not actuated, the pause or stop button which prevents the transport movement of the tape also need not be actuated.

While we have disclosed embodiments of the present invention it is to be understood that these embodiments are given by example only and not in a limiting sense.

We claim:

1. A magnetic tape recorder having a means for actuating recording and a means for actuating playback of sounds as well as a noise suppression means, comprising
   switch means for selectively placing the noise suppression means in operation for direct reproduction of radio broadcasts,
   a sound carrier tape cassette having a magnetic tape therein and a rear wall formed with a selectively removable break-through tab in said wall, the presence of said break-through tab constituting an indicia of an absense of a recording being on the tape, and the absense of said break-through tab defining a break-through opening in said wall, constituting an indicia of a presence of a recording on the tape,
   sensor means for sensing said break-through opening and said break-through tab, respectively, of said cassette, when the latter is positioned in an operating position in the tape recorder,
   said sensor means including a first abutment surface on a front side thereof and a relatively rearwardly disposed second abutment surface, said sensor means and said first abutment surface thereof being formed with a recess defined in part by said second abutment surface, said second abutment surface being disposed behind and adjacent said first abutment surface with respect to a sensing movement direction of insertion of said cassette such that three different positions of said sensing means result, namely:
      a first position wherein said first abutment surface of said sensor means engages against said break-through tab, the latter constituting an unopened wall portion of said cassette;
      a second position wherein said tab is absent and another portion of said wall of said cassette adjacent said break-through opening of said cassette is inserted in said recess and with said second abutment surface on said sensor means abutting against said another portion of said wall of said cassette adjacent said break-through opening;
      a third position wherein said sensor means during an absence of said cassette is unabutted by any wall of said cassette;
   locking means for operatively blocking a movement of the means for actuating recording into an operating condition of the latter, said locking means being operatively connected with said sensor means,
   said sensor means for actuating said locking means to be operative for blocking said means for actuating recording when said sensor means is in said second position, and for making said locking means inoperative to block said means for actuating recording when said sensor means is in said first or third positions, respectively.

2. The magnetic tape recorder, as set forth in claim 1, further comprising
   means for fast rewinding of the magnetic tape,
   actuating means for selectively placing said fast rewinding means in operation,
   means for short circuiting an output of the magnetic tape recorder,
   connecting means operatively disposed between said actuating means and said short circuiting means for short circuiting said output during fast rewinding.

3. The magnetic tape recorder, as set forth in claim 2, wherein
   said connecting means comprises a pivotal lever having a first arm means for operatively actuating said fast rewinding means and said short circuiting means upon a pivotal movement thereof and a second arm disposed in a range of movement of said actuating means, the latter for moving said second arm and pivoting said lever upon actuation thereof.

4. The magnetic tape recorder, as set forth in claim 1, further comprising
   a housing,
   said sensor means is displaceably mounted on said housing and is integrally connected to said locking means for joint movement therewith,
   said means for actuating recording includes a record button,
   said locking means is disposed under said record button for preventing a movement of said record button when said sensor means is in said second position.

5. The magnetic tape recorder, as set forth in claim 4, further comprising
   spring means connected between said housing and said sensor means for biasing said sensor means in a direction opposite to said direction of insertion of said cassette for positioning said locking means out of a blocking position with respect to said record button in said third position in the absence of a cassette.

6. The magnetic tape recorder, as set forth in claim 5, wherein
   said break-through tab displaces said sensor means such that said locking means is positioned in another out of blocking position with respect to said record button in said first position.

* * * * *